(12) United States Patent
Therrien et al.

(10) Patent No.: US 12,724,687 B2
(45) Date of Patent: Sep. 1, 2026

(54) MANAGING RATE-CONTROLLED AND SCHEDULED WORKLOADS IN DISTRIBUTED COMPUTING SYSTEMS

(71) Applicant: MOTOROLA SOLUTIONS, INC., Chicago, IL (US)

(72) Inventors: Nicolas Therrien, Gatineau (CA); Julien Bastien-Beaudet, Ottawa (CA); Michel-Olivier Bouchard, Gatineau (CA); Olivier St-Amour, Gatineau (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1039 days.

(21) Appl. No.: 17/823,010

(22) Filed: Aug. 29, 2022

(65) Prior Publication Data

US 2024/0070046 A1 Feb. 29, 2024

(51) Int. Cl.
*G06F 11/34* (2006.01)
*G06F 9/50* (2006.01)

(52) U.S. Cl.
CPC ........ *G06F 11/3457* (2013.01); *G06F 9/5083* (2013.01); *G06F 11/3442* (2013.01); *G06F 2209/5019* (2013.01); *G06F 2209/505* (2013.01)

(58) Field of Classification Search
CPC ............... G06F 11/3457; G06F 9/5083; G06F 11/3442; G06F 2209/5019; G06F 2209/505; G06F 9/4881; G06F 11/3414; G06F 11/3684; G06F 9/5072
See application file for complete search history.

(56) References Cited

U.S. PATENT DOCUMENTS 5,887,143 A 3/1999 Saito et al.
7,020,878 B1 * 3/2006 Rhee .................... G06F 9/4881 718/103
7,092,985 B2 8/2006 Hubbard
9,332,066 B2 5/2016 Szeto et al.
(Continued)

OTHER PUBLICATIONS

GL Communications Inc., "Traffic Simulation across IP, Analog, TDM, and Wireless Networks with MAPS," <https://www.gl.com/traffic-simulation.html> webpage available at least as early as Feb. 9, 2013 (8 pages).

*Primary Examiner* — Peng Ke
(74) *Attorney, Agent, or Firm* — Michael Best & Friedrich LLP

(57) ABSTRACT

Systems and methods for managing rate-controlled and scheduled workloads in distributed computing systems. One example method provides a distributed two-phase algorithm, which utilizes an external timer service and local high-resolution timers to orchestrate time critical workloads on distributed computing systems. The first phase is a planning phase implemented as a recurrent process by means of repeated registrations to the external timer service. During the planning phase, a portion or all of the workload to be performed is broken down into small batches to be assigned to computing instances for execution at a later time. The second phase is a batch execution phase. Each batch planned during the planning phase includes fine-grained instructions as to when each item within the batch is to be executed. The computing instance receiving the batch uses local high-resolution timers to synchronize the execution of items relative to one another.

20 Claims, 7 Drawing Sheets

(56) References Cited

U.S. PATENT DOCUMENTS

| | | | | |
|---|---|---|---|---|
| 9,635,103 | B2 * | 4/2017 | Earl | G06F 9/5016 |
| 2016/0342445 | A1 * | 11/2016 | van der Lugt | H04L 67/10 |
| 2018/0365063 | A1 * | 12/2018 | Dattaray | G06F 9/505 |
| 2021/0318906 | A1 * | 10/2021 | Mohalik | G06F 9/505 |
| 2022/0398128 | A1 * | 12/2022 | Jose, Jr. | G06F 9/4881 |

* cited by examiner

MANAGING RATE-CONTROLLED AND SCHEDULED WORKLOADS IN DISTRIBUTED COMPUTING SYSTEMS

BACKGROUND OF THE INVENTION

Some network attached computing platforms are designed to generate, receive, route, or otherwise process data through large amounts of sessions. Such platforms may implement IP telephony, video conferencing, IP-based push-to-talk communication, multimedia streaming, and other services. In some instances, the platforms may have to process many thousands of connections per hour. Testing systems generate simulated network traffic to stress test the platforms to ensure that they can handle the expected loads and to test new software and hardware configurations before they are deployed in service.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

Figure 1:
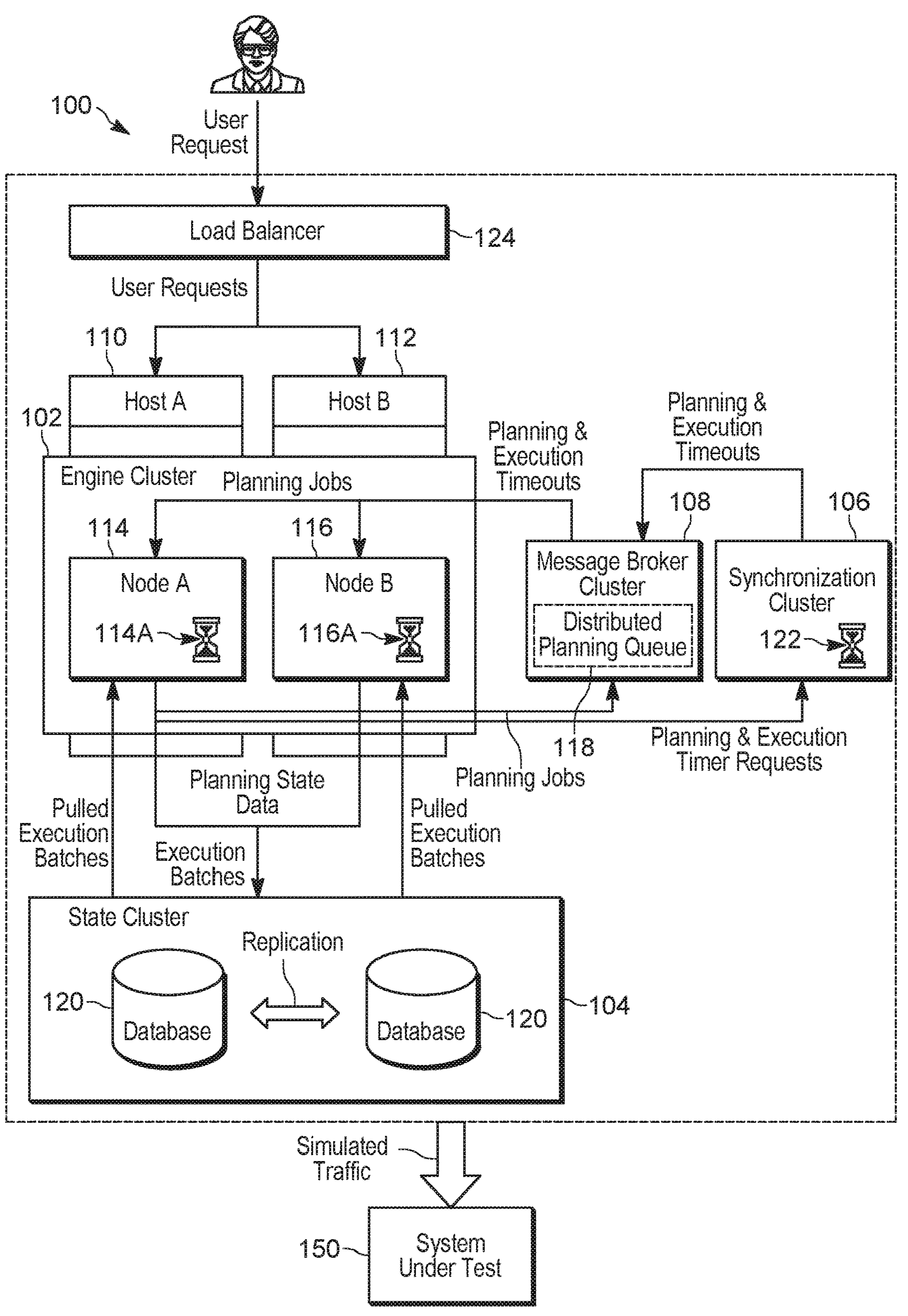
FIG. 1 illustrates a distributed computing system in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to understanding the of various embodiments, examples, aspects, and features so as not to obscure the disclosure with details that will be readily apparent to those of ordinary skill in the art having the benefit of the description herein.

DETAILED DESCRIPTION OF THE INVENTION

Scheduling workloads for distributed computing environments at scale and at specified rates is difficult. To maintain a specified rate, a common design involves scheduling workloads on a central computer. However, a central computer can quickly become overloaded when scaling workloads to very large amounts. Distributing the workload over multiple instances to avoid overload may result in incorrect rates because each instance is not aware of what the other instances are doing and when it is being done.

To address, among other things, these technical problems with current computing workload scheduling technology, systems and methods are provided herein for managing rate-controlled and scheduled workloads in distributed computing systems. Among other things, examples and aspects presented herein provide a distributed two-phase algorithm, which utilizes an external timer service and local high-resolution timers to orchestrate time critical workloads on distributed computing systems.

In one example, the first phase is a planning phase implemented as a recurrent process by means of repeated registrations to the external timer service. During the planning phase, a portion or all of the workload to be performed is broken down into small batches to be assigned to computing instances for execution at a later time. Batch assignments are controlled using external timer service registrations. The planning phase is both recursive and stateless, enabling it to run an infinite number of workloads without any impact during initialization and without exhausting computing node resources.

The second phase is a batch execution phase. Each batch planned during the planning phase includes fine-grained instructions as to when each item within the batch is to be executed. The computing instance receiving the batch uses local high-resolution timers to synchronize the execution of items relative to one another. Using local timers compensates for network latency issues associated with using external timers to process instructions. In some aspects, some algorithm parameters are included in metadata of the workload batches. To improve scalability, a single batch always runs on a single computing instance. In some aspects, if the batch were too big (for example, if a batch exceeds the capacity of a computing instance to perform the batch in a desired timeframe), the planning phase will break it down prior to scheduling. In this way, by the time a batch is executed by a computing instance, it will be right-sized.

Embodiments and aspects presented herein provide for a stateless and fully distributed workload scheduling algorithm, to avoid the rate limiting and other constraints inherent in techniques utilizing a central load balancer. The distributed workload scheduling algorithm can be used to schedule workloads all at once or at individual times. Because time synchronization is split in two parts, one based on a centralized distributed service, and another based on local performance timers, the execution of the algorithm is fully distributed. In addition, the two-stage process takes into account and compensates for network latencies.

Embodiments and aspects presented herein also provide for a user customizable distribution of workload density over time in the way that best suits the user's needs.

By increasing the workload scheduling and processing capacity of the distributed computing environment, the embodiments and aspects provided herein improve the functioning of the distributed computing environment, as well as the individual components that make up the computing environment.

One example embodiment provides a workload distribution system for a distributed computing environment. The system includes a message broker cluster including a planning queue, a state cluster including a plan state database storing a plan, a synchronization cluster operating a global timer service, and an engine cluster including a plurality of computing nodes. Each node is configured to execute a planning process that includes, responsive to receiving a planning timeout from the synchronization cluster: generating a planning job based on the plan, and storing the planning job in the planning queue. The planning process further includes, responsive to receiving an available planning job from the planning queue: processing the available planning job to generate a first execution batch, and storing the first execution batch in the plan. Each node is further configured to, while concurrently executing the planning process, execute a batch execution process that includes, responsive to receiving an execution timeout from the synchronization cluster: retrieving from the state cluster, based on the execution timeout, a second execution batch, and processing the second execution batch to execute a workload.

Another example embodiment provides a method for distributing computing workloads in a distributed computing environment. The method includes, executing, on each of a plurality of computing nodes, a planning process that includes, responsive to receiving a planning timeout from a synchronization cluster operating a global timer service: generating a planning job based on the plan, and storing the planning job in a planning queue. The planning process further includes, responsive to receiving an available planning job from the planning queue: processing the available planning job to generate a first execution batch, and storing the first execution batch on a state cluster. The method further includes, while concurrently executing the planning process, executing, on each of the plurality of computing nodes, a batch execution process that includes, responsive to receiving an execution timeout from the synchronization cluster: retrieving from the state cluster, based on the execution timeout, a second execution batch, and processing the second execution batch to execute a workload.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 is a diagram of an example distributed computing system 100, which is configured to, among other things, perform stateless and fully distributed workload scheduling. In the example illustrated, the system 100 includes an engine cluster 102, a state cluster 104, and a message broker cluster 108. The components of the system 100 are communicatively coupled to one another by, for example, a communications network (not shown) and network connections. An example communications network includes wireless connections, wired connections, or combinations of both. A suitable communications network may be implemented using various local and wide area networks, for example, a Bluetooth™ network, a Wi-Fi™ network), the Internet, a land mobile radio network, a cellular data network, a Long Term Evolution (LTE) network, a 4G network, a 5G network, or combinations or derivatives thereof.

In some instances, the system 100 is or is implemented by a cloud computing environment. In some instances, the components of the system 100 may be distributed among multiple locations and communicatively coupled to one another via one or more communications networks.

The engine cluster 102 is made up of one or more network attached computers (also referred to herein as computing hosts because they each host one or more virtual computing nodes), which work together as if they are a single more powerful machine. In the illustrated example, the engine cluster 102 includes a computing host 110 and a computing host 112 (also referred to as Host A and Host B, respectively). The computing host 110 is described more particularly with respect to FIG. 2. Computing host 112 includes similar components and is configured similarly to provide similar functionality as the computing host 110. Although not required, in some instances the computing host 110 and the computing host 112 are substantially identical.

The computing hosts provide a plurality of virtual computing nodes. In the illustrated example, the engine cluster 102 provides a computing node 114 and a computing node 116 (also referred to as Node A and Node B, respectively). As described herein, the computing nodes 114, 116 implement local high-resolution timer services 114A, 116B that allow the computing nodes to perform tasks at precisely specified times. Although FIG. 1 illustrates the engine cluster 102 implementing only two computing nodes, the methods described herein are applicable to instances of distributed computing environments implementing tens, hundreds, or thousands of virtual computing hosts. It should be noted that all virtual computing nodes are identical with regard to computing capacity (e.g., some nodes may be capable of processing more data more quickly that other nodes).

In the illustrated example, the state cluster 104, the synchronization cluster 106, and the message broker cluster 108 are each also made up of one or more virtual computing nodes. Such nodes may be implemented by computing hosts 110, 112, on other computing hosts (not shown), or combinations of both. The physical computing hosts, which implement the virtual computing nodes, may be located in physical proximity to one another (for example, in a single data center) or may be distributed geographically. In some instances, one or more of the clusters may be implemented non-virtually, that is, on a cluster of physical machines (each operating as a single computing node).

The state cluster 104 implements a plan state database 120, as described herein. The plan state database 120 is an electronic database. As illustrated in FIG. 1, the plan state database 120 is implemented redundantly (for example, with multiple nodes each maintaining a copy of the database and performing replication techniques to keep the data synchronized). As described herein, the state cluster 104 stores workload execution plans, planning state data for the plans, and execution batches, which include workloads to be executed by the engine cluster nodes according to the workload execution plans.

The synchronization cluster 106 implements a global timer service 122, which the synchronization cluster 106 uses to send planning and execution timeouts to the message broker cluster according to planning and execution timer requests received from the nodes.

The message broker cluster 108 operates a message broker service (for example, an Apache Kafka, RabbitMQ, or similar software platform). The message broker cluster 108 hosts a distributed planning queue 118 (also referred to herein as the "planning queue"), which stores planning jobs placed in and retrieved from the planning queue by the nodes 114, 116, as described herein. In some instances, the message broker cluster 108 includes a redundantly implemented electronic database for storing planning queue information, as described herein. As described herein, the nodes of the engine cluster 102 receive planning and execution timeouts from the message broker cluster 108.

In the example illustrated in FIG. 1, the system 100 also includes a load balancer 124, which distributes user requests to the nodes of the engine cluster 102, as described herein.

As illustrated in FIG. 1, and described more particularly below, the engine cluster 102 receives a user request (also referred to herein as a workload generation request) to generate a defined workload for a system under test 150. For example, the user request may be to produce simulated network traffic (e.g., voice over IP calls) at a particular rate (e.g., one hundred calls per minute) during a particular timeframe (e.g., between 8:00 PM and 9:30 PM). User requests may also include requests for non-linear workloads, for example, a burst pattern or a custom pattern.

The nodes 114, 116 process the user request to generate planning jobs, which are stored in the planning queue 118 on the message broker cluster 108, retrieved from the planning queue 118, and processed to produce execution batches. The execution batches are stored on the state cluster 104 and pulled from the state cluster 104 by the nodes 114, 116 based on execution timeouts received from the synchronization cluster 106.

Figure 2:
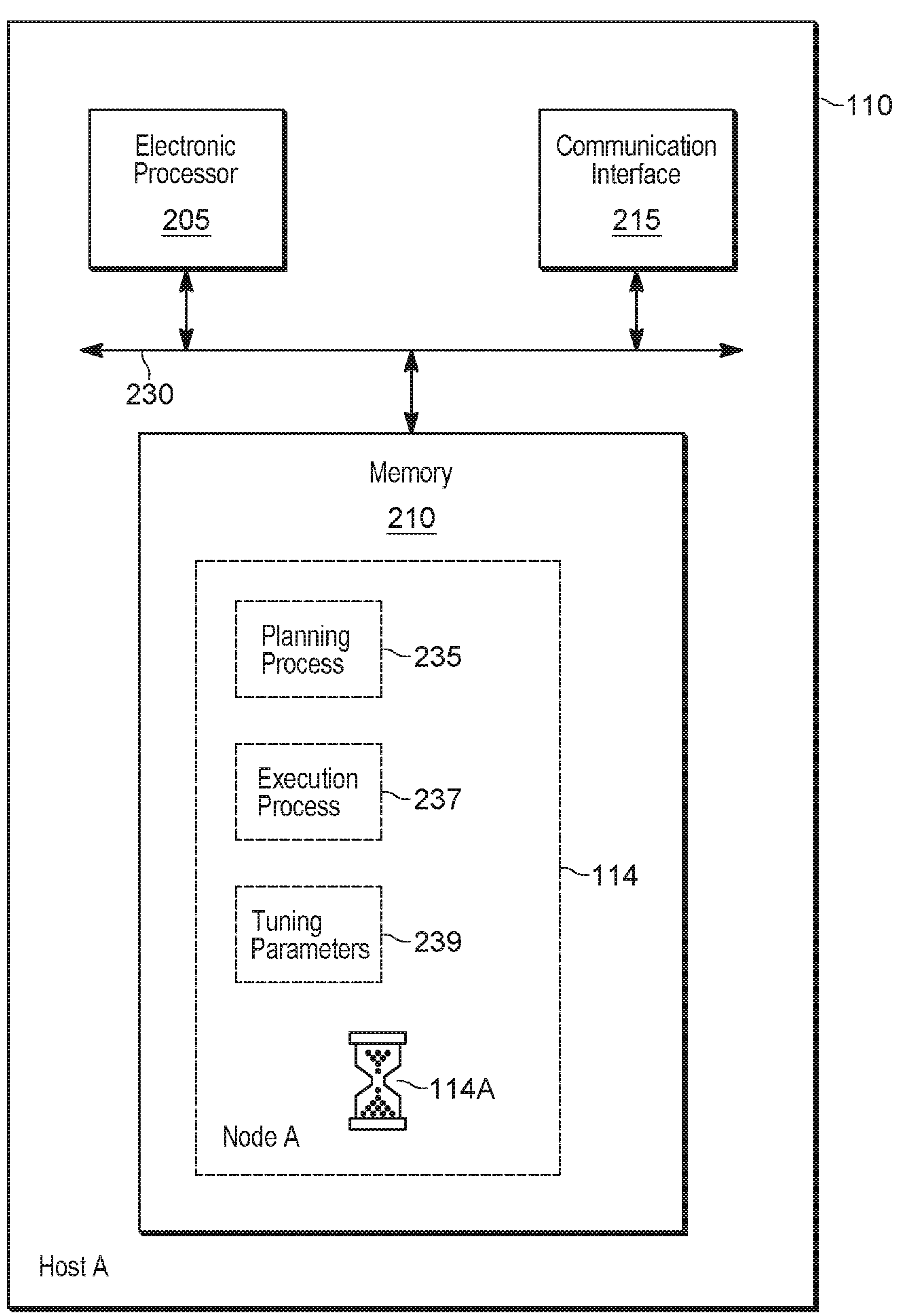
FIG. 2 is a diagram of a computing host of the system of FIG. 1 in accordance with some examples.

FIG. 2 schematically illustrates the computing host 110 in more detail. In the example provided, the computing host 110 includes an electronic processor 205, a memory 210, and a communication interface 215. Although illustrated and described by way of example with a single electronic processor, instances of the computing host 110 (and the computing host 112) may include multiple electronic processors. The illustrated components, along with other various modules and components (not shown) are coupled to each other by or through one or more control or data buses (for example, a communication bus 230) that enable communication therebetween.

The electronic processor 205 obtains and provides information (for example, from the memory 210 and/or the communication interface 215) and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions.

The memory 210 can include a program storage area and a data storage area. The program storage area and the data storage area can include combinations of distinct types of memory, as described herein. The electronic processor 205 is configured to retrieve from the memory 210 and execute, among other things, software to carry out the methods described herein.

The communication interface 215 is an electronic communication interface configured to receive input and to provide system output. The communication interface 215 obtains information and signals from, and provides information and signals to, (for example, over one or more wired and/or wireless connections) devices both internal and external to the computing host 110. The communication interface 215 may include a wireless transmitter or transceiver for wirelessly communicating over one or more communications networks. Alternatively, or in addition to a wireless transmitter or transceiver, the communication interface 215 may include a port for receiving a cable, such as an Ethernet cable, for communicating over a communications network or a dedicated wired connection. It should be understood that, in some embodiments, the computing host 110 communicates with other devices through one or more intermediary devices, such as routers, gateways, relays, and the like. In some instances, the communication interface 215, other components of the computing host 110, or both, are configured to provide one or more virtual network adapters for providing communications to and from virtual computing nodes operating on the computing host 110.

In some instances, the electronic processor 205, in conjunction with the memory 210, operates to provide one or more virtual computing nodes (for example, virtual servers), such as, for example, the computing node 114. The example instance of the computing node 114 illustrated in FIG. 2 operates, in addition to the high-resolution timer server 114A, a planning process 235 and an execution process 237 according to a set of tuning parameters 239, all of which are described in detail herein.

Figure 3:
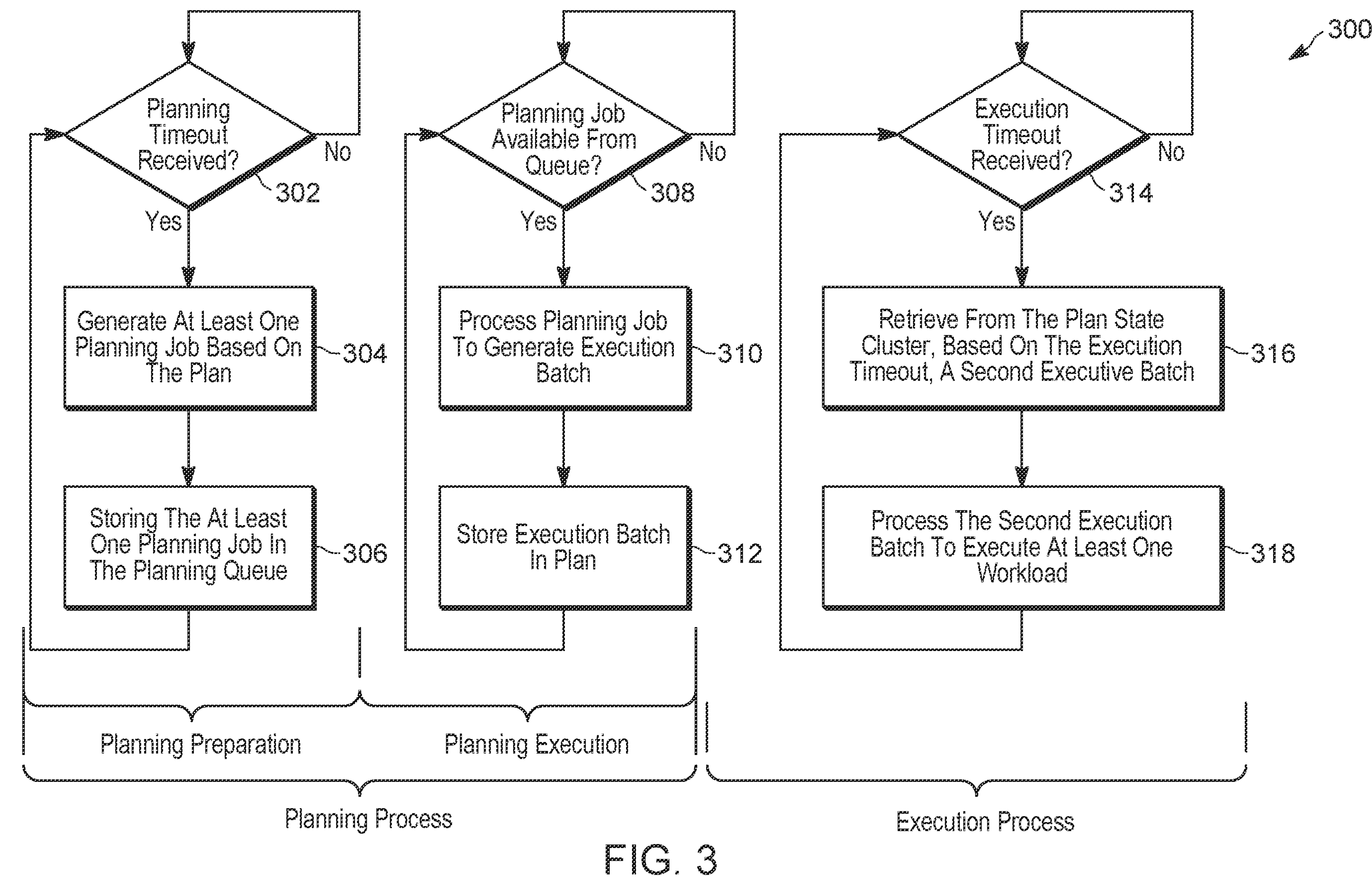
FIG. 3 is a flowchart illustrating a method for managing rate-controlled and scheduled workloads in accordance with some examples.

FIG. 3 illustrates an example method 300 for workload distribution. Although the method 300 is described in conjunction with the system 100 as described herein, the method 300 could be used with other systems and devices. In addition, the method 300 may be modified or performed differently than the example provided.

As an example, the method 300 is described as being performed by a computing node (and thus it is also performed by one or more electronic processors of the host(s) instantiating the computing node). The method 300 may be the computing node 114, the computing node 116, or any other computing node of the engine cluster 102. However, it should be understood that, in some examples, portions of the method 300 may be performed by other devices, including for example, the state cluster 104, the synchronization cluster 106, and the message broker cluster 108. For ease of description, the method 300 is described in terms of a single virtual computing node. However, the method 300 may be performed by a physical computing device and may also be performed by physical computing devices and/or multiple virtual computing nodes.

As illustrated in FIG. 3, the method 300 is performed by the node executing two processes that operate on the node concurrently. The first process is a planning process (described with respect to blocks 302-312), which includes two sub-processes: planning preparation (described with respect to blocks 302-306) and planning execution (described with respect to blocks 308-312). The planning process prepares a plan for performing a requested workload. Computing nodes are stateless and abstract (that is, they can execute anything). This provides a flexible and scalable infrastructure. If more processing power is needed, more nodes are added. The algorithms will make the most of the available processing power. The planning phase's role is to make sure the sizing of the batches allows for smooth distribution among the available nodes.

The second process is the batch execution process (described with respect to blocks 314-318). The execution process retrieves and executes batches of workload to work the plan created by the planning process. Although the processes are executing at the same time, they are not synchronized with one another locally or dependent on one another to perform their respective operations.

A plan can be viewed as a continuous stream of scheduling events. Plan state information, stored with the plan in the plan state database 120, keeps information about where the plan is at any given time (how much of the plan has been executed).

The parallel processes combine to form a distributed workload distribution algorithm. Portions of the algorithm operated based on a set of tuning parameters. Tuning parameters are predetermined to control aspects of the operation of the algorithm. A non-limited list of tuning parameters follows.

Start Time: This parameter specifies when the plan is set to start. As noted below, a workload generation may include a start time, which allows the user to set the entire workload to run at a later time (as opposed to beginning immediately).

Planning Queue Size (seconds): This parameter is used by the planning process to define how much of the plan's timeline needs to be scheduled ahead of time in order to keep up with the workload. This is akin to a buffer in a network-based video playback application (e.g., the larger the buffer, the more resilient the algorithm will be to latency problems).

Max Planning Job Size: The parameter specifies the maximum amount of work that can be included in a single planning job. This number may be reduced if the initializing node is experiencing a delay during initialization.

Max Planning Job Duration: This parameter defines the maximum amount of time any node is allowed to spend processing a planning job. This parameter is set to ensure that execution batches are produced with sufficient time between their production and the time they are to be executed to allow them to be executed in time to meet the requested workload generation criteria.

Hysteresis Value: This parameter specifies the amount of time used when computing fire times for planning and execution timers. The amount of time is based on a network latency for the system. By basing a requested fire time on the desired Batch Start Time and a Hysteresis Value, execution timeouts may be called ahead of the desired Batch Start Time to compensate for network latency. The Hysteresis Value may also be applied to Planning Timers to ensure they fire as desired, compensating for network latency.

Batch Start Time: This parameter is set for an individual execution batch and specifies when an execution batch is set to start. This parameter is set during the planning phase and used as a reference by the node executing the batch to set local high-performance timers for workload items in the batch.

Max Batch Duration: This parameter defines the maximum amount of time that any node should spend processing a batch. This parameter is set to reduce the risk of a node being shut down in the middle of a batch.

Max Work Items Per Batch: This parameter defines the maximum amount of workload a node can handle within the timeframe of a max batch duration. The planning process will take both time and load into account and fragment the batches further until these two parameters are met.

Figure 4:
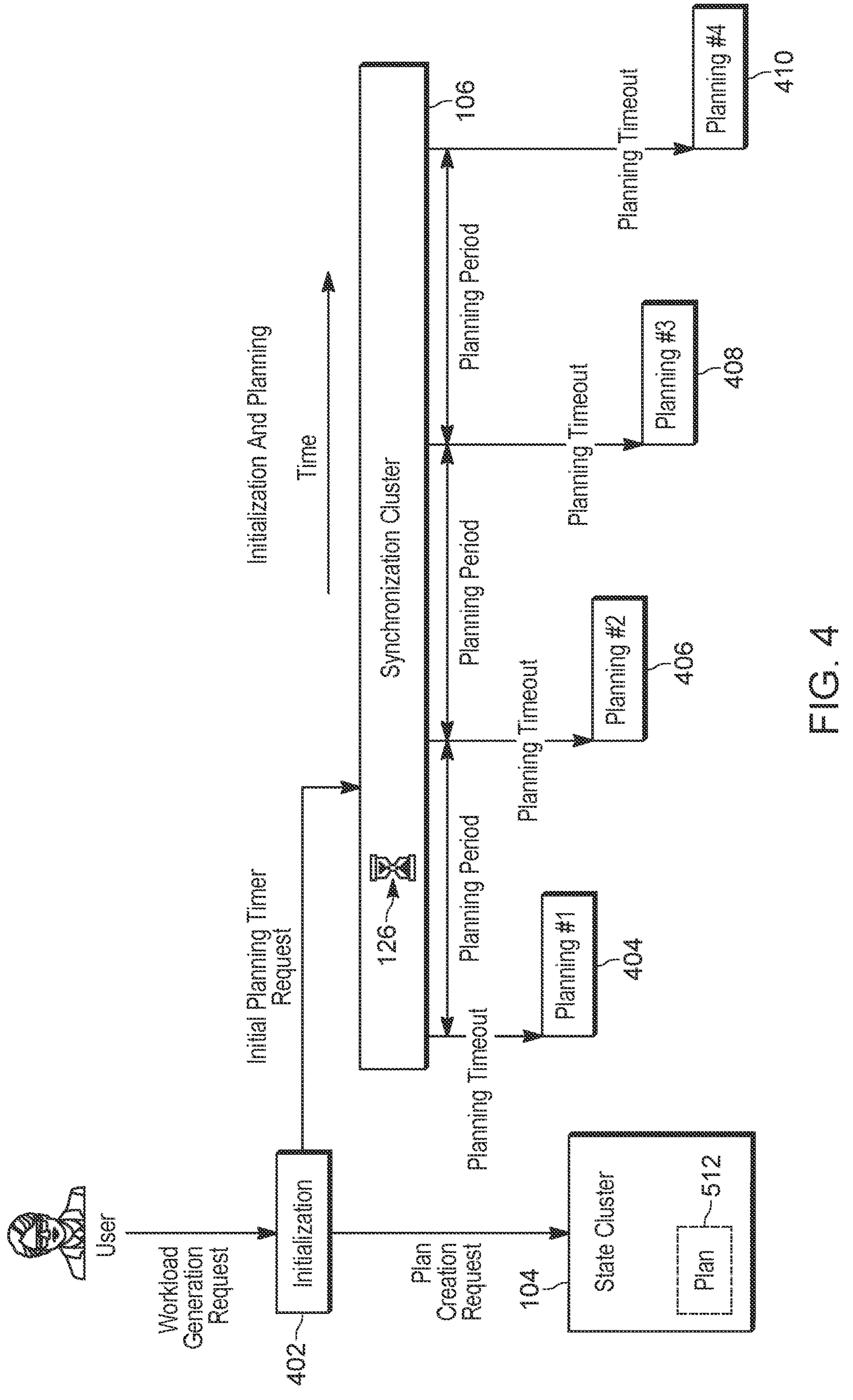
FIG. 4 is a diagram illustrating aspects of the execution of the method of FIG. 3 in accordance with some examples.

In some instances, any or all of the computing nodes are configured to execute, concurrently with the planning and batch execution processes, an initialization process based on a user request (referred to herein as a workload generation request). For example, as illustrated in FIG. 4, the node receives a workload generation request, and, responsive to receiving the workload generation request, executes an initialization process 402. A workload generation request is a request to perform specific tasks at specific times and/or rates. As described herein, the workload generation request is a request to generate simulated network traffic flows to test systems designed to handle network traffic of that type. However, applications of the method 300 are not limited to workloads involving simulated network traffic. Any time-dependent computing workloads may be distributed using the methods described herein.

On one example, a workload generation request may include a request to generate Voice over IP (VoIP) traffic at a rate of one thousand calls per minute for one hour. To generate the requested workload, the system 100 operates according to the method 300 to schedule and distribute the workload among the available computing nodes.

The initialization process, upon receipt of the workload generation request, initializes a plan 512 in the plan state database 120 of the state cluster 104, based on the workload generation request. For example, the node may send an electronic message or other suitable command to the state cluster 104 to reserve a portion of the plan state database 120 for the plan 512. In some instances, the message includes a plan identifier (e.g., a unique alphanumeric identifier used to distinguish the plan from any other plans stored in the plan state database 120). In some instances, the node also stores the details of the workload generation request in the newly created plan.

The initialization process also schedules the start of the planning flow, by transmitting an initial planning timer request, based on the workload generation request, to the synchronization cluster 106. For example, the node sends a suitable electronic message that includes the plan identifier for the plan and an initial fire time. The initial fire time is the requested time of the first planning timeout. For example, where the workload generation request includes a specific real world time range for the workload execution, the node may set the initial fire time prior to a Start Time tuning parameter specified in the workload generation request, taking into account the time required to begin the planning process (for example, the Hysteresis Value tuning parameter). Where the workload generation request does not include a specific real world time range for the workload execution, the node may set an initial fire time based on the current time and the Hysteresis Value tuning parameter, to begin the planning flow as soon as possible.

The synchronization cluster 106, upon receiving the initial planning timer request, starts a timer set to expire at the initial fire time. Upon expiration of the timer (the timeout), the synchronization cluster 106 transmits a planning timeout (e.g., an electronic message) to the message broker cluster 108. The initial planning timeout message includes the plan identifier. Because it is a stream, the plan does not have to be complete at the end of the initialization. The goal is just to get the planning process started. In some instances, the initialization process 402 may create an initial planning job and place them in the planning queue before the first planning timeout issues. In this way, an instance of the system 100 may receive and carry out one or more user requests concurrently.

Returning to FIG. 3, each of the nodes in the engine cluster 102 is also concurrently executing a planning process, which responds to received planning timeouts (at block 302). For example, in some instances, the node receives a planning timeout by receiving a message waiting status relating to a planning timeout from the message broker cluster 108. While no planning timeout has been received, the planning process continues to execute until it receives a planning timeout. When a planning timeout is received, planning of work takes place, as described below. For example, as illustrated in FIG. 4, every planning period, the synchronization cluster 106 issues a planning timeout (including the plan ID). Each planning timeout triggers an iteration of the planning process, for example, a first planning stage 404, a second planning stage 406, a third planning stage 408, and a fourth planning stage 410.

Returning to FIG. 3, responsive to receiving a planning timeout from the synchronization cluster 106, via the message broker cluster 108 (at block 302), the node generates at least one planning job based on the plan (at block 304). A planning job is a portion of the plan and corresponds to a time range of an overall timeline of the real-world workflow that has been requested in the user request. In some aspects, the portion of the plan sized according to the Max Planning Job Size parameter.

In some instances, the node retrieves, from the plan state database 120, a current state for the plan. For example, the node may make a query to the plan state database 120 using the plan identifier received in the planning timeout. The node determines, based on the current state and a planning queue size for the plan, whether additional planning jobs should be scheduled. For example, where the planning queue size specifies that enough planning jobs should be in the queue to provide planning work for the next ten minutes, but only five minutes' worth of planning jobs are in the queue, the node schedules additional planning jobs.

In response to determining that additional planning jobs should be scheduled, the node generates the appropriate number of planning jobs, based on the Max Planning Job Size and Max Planning Job Duration parameters. A planning job specifies the planning work to be performed for a specific time range of the plan.

Figure 5:
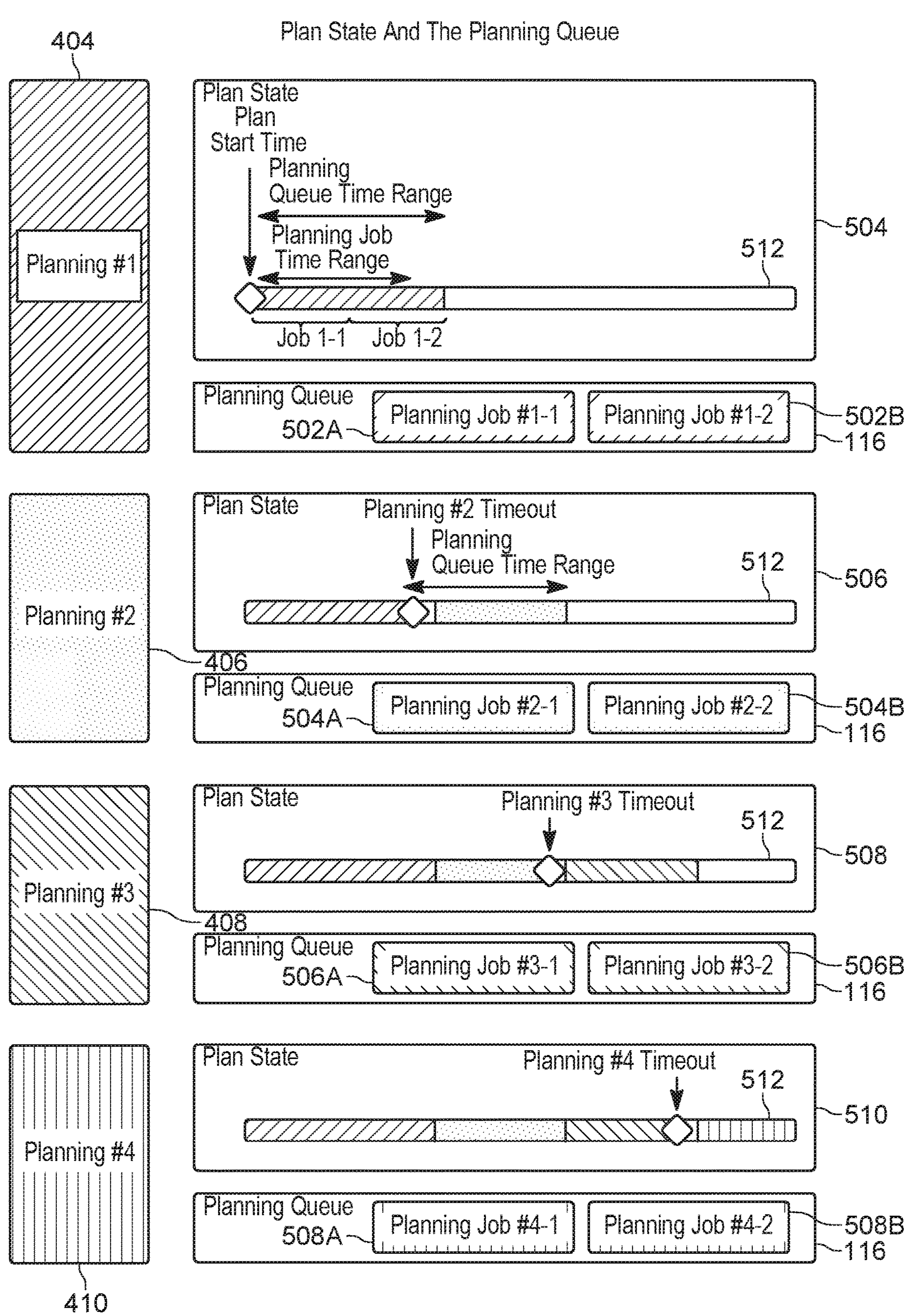
FIG. 5 is a diagram illustrating aspects of the execution of the method of FIG. 3 in accordance with some examples.

At block 306 the node stores the planning job or jobs it created in the planning queue. For example, as illustrated in FIG. 5, during the first planning stage 404, two planning jobs 502A, 502B are added to the planning queue 116. The plan state 504 for the plan 512 reflects that the plan has just begun, and planning jobs will be performed. Similarly, during subsequent planning stages 406, 408, and 410, the node generates planning jobs 504A, 504B, 506A, 506B, 508A, and 508B and adds them to the planning queue 116. Plan states 506, 508, and 510 reflect these additions.

When the node completes producing planning jobs to load the planning queue, it transmits a planning timer request to the synchronization cluster. For example, the planning timer request includes a plan identifier for the plan and a planning fire time based on a planning period for the plan. The synchronization cluster 106, upon receiving the planning timer request, starts a timer set to expire at the planning fire time. Upon expiration of the timer (the timeout), the synchronization cluster 106 transmits a planning timeout (e.g., an electronic message) to the message broker cluster 108. The planning fire time may take into account the Hysteresis Value tuning parameter. The planning timeout message includes the plan identifier. As set forth above, the nodes of the engine cluster 102 receive the planning timeout and act on the timeout (at blocks 302-306).

Returning to FIG. 3, the node responds, at block 308, to receiving an available planning job from the planning queue. In some instances, the node (that is, the planning execution sub-process) may receive an available planning job from the planning queue by receiving a message waiting status from the message broker cluster 108. In some instances, the node may poll the message broker cluster 108 to receive an available planning job from the planning queue. Where no planning jobs are available, the planning execution process continues executing until planning jobs are available. The nodes are configured to process available planning jobs as soon as possible on a continuous basis as long as planning jobs are available for processing.

Responsive to receiving an available planning job (at block 308), the node processes the available planning job to generate one or more execution batches (at block 310). An execution batch includes one or more workloads containing fine-grained instructions on when each task needs to be executed. As described below, the node receiving an execution batch uses local high-resolution timers to synchronize tasks relative to each other. For example, an execution batch may specify that ten calls must be generated at every second of a particular minute to meet the requirements of the workload generation request. In some instances, where an execution batch resulting from a planning job would exceed the Max Batch Duration or Max Work Items Per Batch parameters, the node will create two or more execution batches within parameters.

Figure 6:
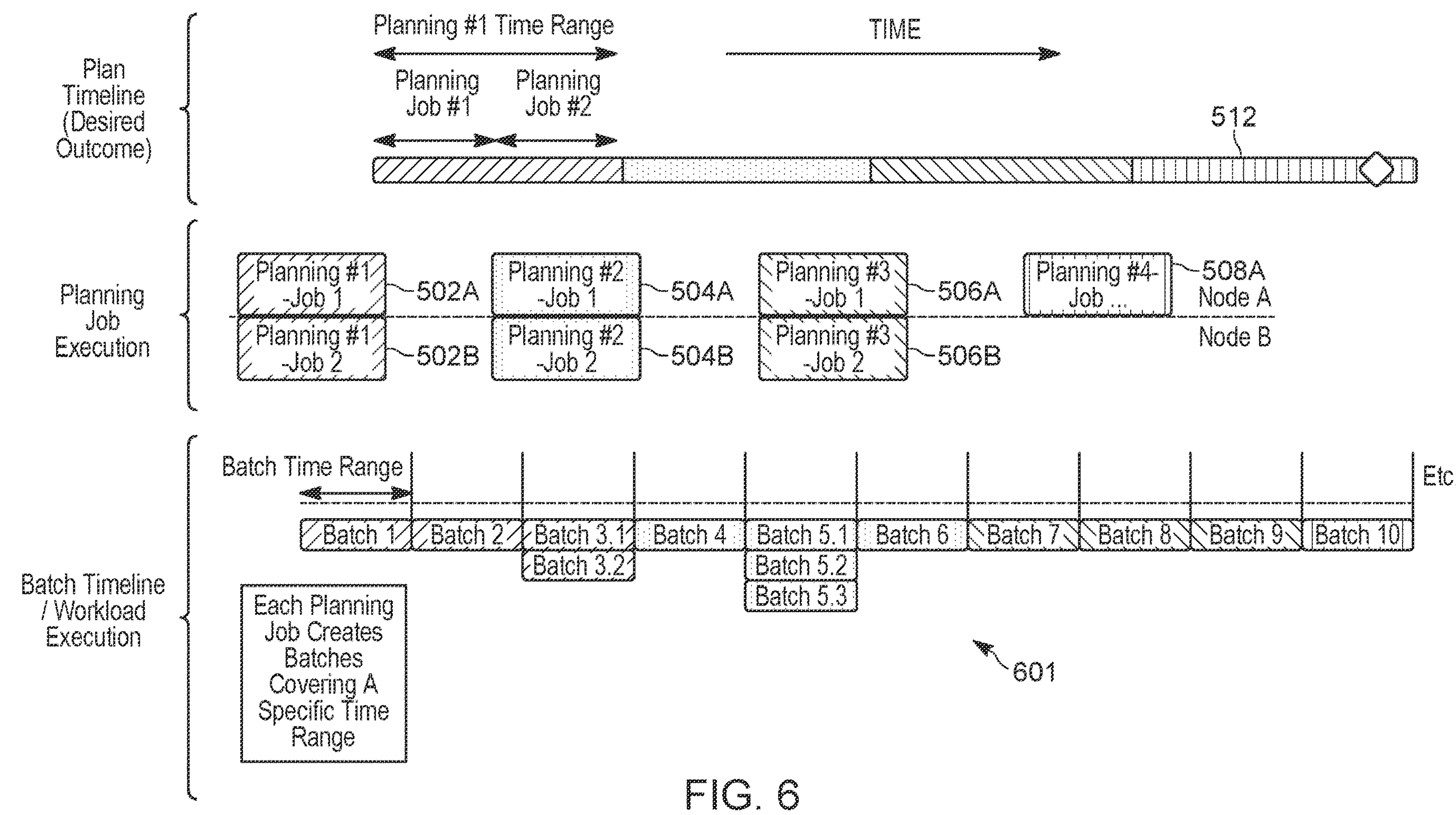
FIG. 6 is a diagram illustrating aspects of the execution of the method of FIG. 3 in accordance with some examples.

For example, as illustrated in FIG. 6, Nodes A (node 112) and B (node 114) process planning jobs 502A, 502B, 504A, 504B, 506A, 506B, and 508A to produce a plurality of execution batches 601. As illustrated in FIG. 6, execution batches 3 and 5 were splint into sub-batches.

Returning to FIG. 3, at block 312, the node stores the execution batch in the plan. For example, the node may make a query to the plan state database to enter the execution batch. Each batch is assigned a unique batch identifier and stored in the plan using the batch identifier.

For each execution batch it generates, the node transmits an execution timer request, based on the execution batch, to the synchronization cluster. For example, the node may transmit a suitable electronic message including the plan identifier for the plan, the batch identifier for the execution batch, and an execution fire time (also referred to herein as the Batch Start Time). The execution fire time specifies when the batch should start executing and may take into account the Hysteresis Value tuning parameter.

The synchronization cluster 106, upon receiving the execution timer request, starts a timer set to expire at the execution fire time. Upon expiration of the timer (the timeout), the synchronization cluster 106 transmits a planning timeout (e.g., an electronic message) to the message broker cluster 108. In some instances, the execution timeout message includes the plan identifier and the batch identifier. As set forth below, the nodes of the engine cluster 102 receive the execution timeout and act on the timeout (at blocks 314-318).

In some instances, after retrieving the available planning job from the planning queue, the node determines whether the planning job is too complex to be completed during the current planning period. For example, the node may generate a planning job complexity metric for the planning job based on the type and duration of real-world workflow specified by the planning job, the available processing power for the node or an average node of the system, the amount of time left in the current planning period, and other similar factors. In some instances, the complexity metric is a numeric value that represents the likelihood that the node would be able to complete the planning job during the current planning period. In some instances, the complexity metric is a numeric value representing an estimate of how long it will take for the node to complete the planning job. In some instances, the complexity metric is determined based on the Max Planning Job Size tuning parameter. For example, the complexity metric may be a numeric value representing a ratio of the planning job size to the Max Planning Job Size. In some instances, the planning job complexity metric is determined using a combination of the forgoing (for example, the Max Planning Job Size may be taken into account when determining a probability that the node would be able to complete the planning job during the current planning period. In some instances, when a node determines that the complexity metric exceeds a maximum threshold (for example, a maximum probability, the time remaining in the current planning period), the node generates two or more smaller planning jobs from the retrieved planning job and stores the smaller planning jobs in the planning queue.

While the node continues executing the planning process, it also executes the batch execution process. In this way, distributed planning and execution of the plan occurs continuously until the plan is complete. The execution process waits to receive execution timeouts (at block 314). When an execution timeout has not been received, the execution process continues to wait for an execution timeout. When an execution timeout is received, batch execution takes place, as described below.

The node, responsive to receiving an execution timeout from the synchronization cluster (at block 314), retrieves from the state cluster, based on the execution timeout, an execution timeout (at block 316). For example, the node may query the plan state database to retrieve a portion of the plan specified by the execution batch identifier.

Figure 7:
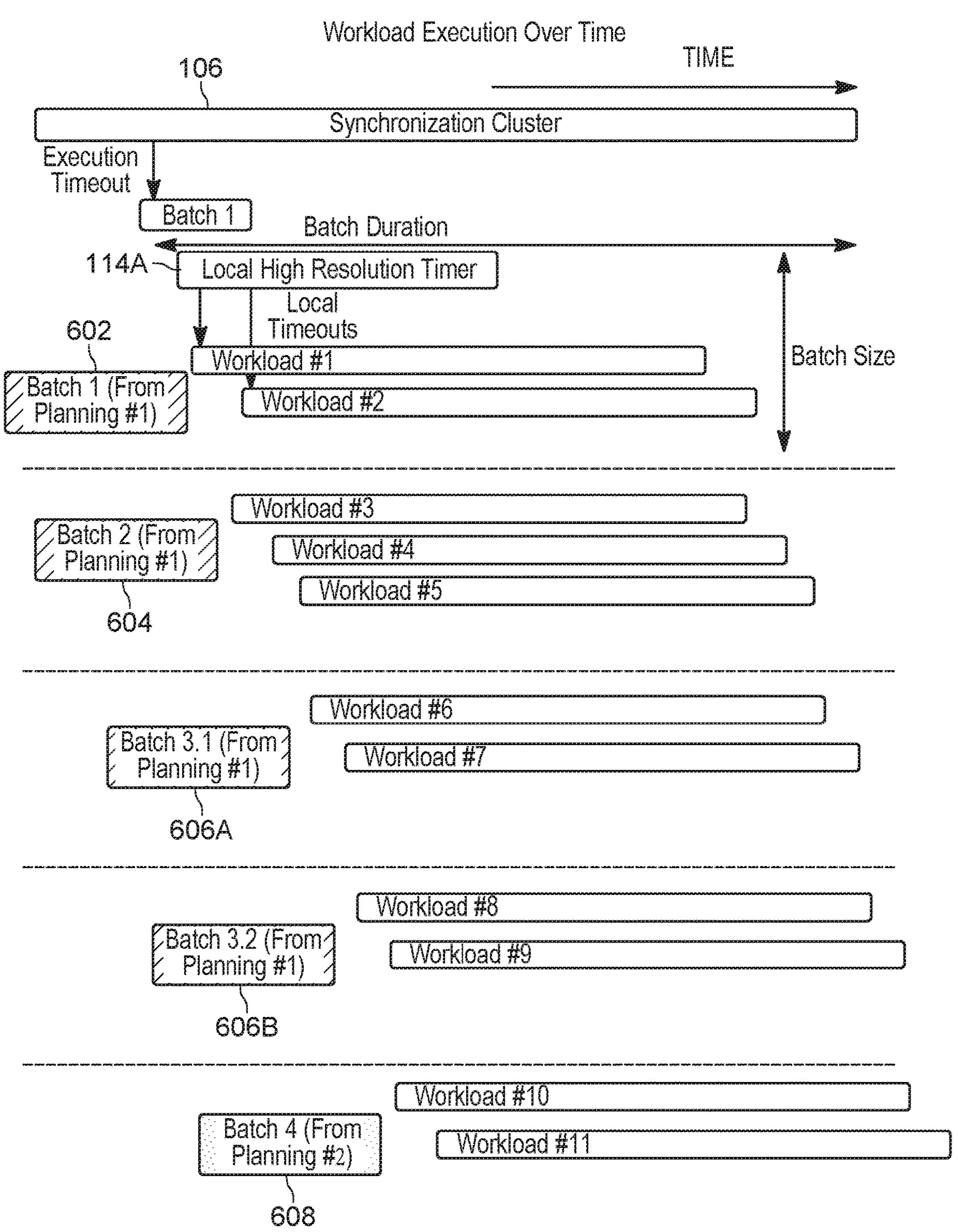
FIG. 7 is a diagram illustrating aspects of the execution of the method of FIG. 3 in accordance with some examples.

At block 318, the node processes the execution batch. An execution batch includes one or more workloads. A workload includes one or more tasks to be performed at particular execution times. Processing the execution batch includes scheduling, with the local high-resolution timer service, one or more local execution timeouts based on the execution times for the one or more tasks and performing the tasks at the execution times using the local execution timeouts generated by the local high-resolution timer service. For example, as illustrated in FIG. 7, the synchronization cluster 106 issues an execution timeout for execution batch 1. The node, using two local timeouts from the local high-resolution timer 114A, executes two workloads from execution batch 1.

The nodes, as they pull and process execution batches update the plan state database 120 with their current state information.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and IC s with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A workload distribution system for a distributed computing environment, the system comprising:
a message broker cluster including a planning queue;
a state cluster including a plan state database storing a plan;
a synchronization cluster operating a global timer service; and
an engine cluster including a plurality of computing nodes, wherein each of the plurality of computing nodes is configured to:
execute a planning process that includes:
responsive to receiving a planning timeout from the synchronization cluster:
generating a planning job based on the plan, and
storing the planning job in the planning queue; and
responsive to receiving an available planning job from the planning queue:
processing the available planning job to generate a first execution batch, and
storing the first execution batch in the plan; and
while concurrently executing the planning process, execute a batch execution process that includes:
responsive to receiving an execution timeout from the synchronization cluster:
retrieving from the state cluster, based on the execution timeout, a second execution batch, and
processing the second execution batch to execute a workload.

2. The workload distribution system of claim 1, wherein:
each of the plurality of computing nodes is further configured to:
receive a workload generation request, and, responsive to receiving the workload generation request:
initialize the plan, based on the workload generation request, in the plan state database, and
transmit, to the synchronization cluster, an initial planning timer request including a plan identifier for the plan and an initial fire time; and
the synchronization cluster is configured to transmit an initial planning timeout, including the plan identifier, to the engine cluster at the initial fire time.

3. The workload distribution system of claim 1, wherein:
the planning process further includes:
responsive to receiving the planning timeout:
retrieving, from the plan state database, a current state for the plan based on the planning timeout,
determining, based on the current state and a planning queue size for the plan, whether additional planning jobs should be scheduled,
generating the planning job responsive to determining that additional planning jobs should be scheduled, and
transmitting, to the synchronization cluster, a planning timer request including a plan identifier for the plan and a planning fire time based on a planning period for the plan; and
the synchronization cluster is configured to transmit a second planning timeout, including the plan identifier, to the engine cluster at the planning fire time.

4. The workload distribution system of claim 1, wherein:
the planning process further includes transmitting, to the synchronization cluster, an execution timer request including a plan identifier for the plan, a batch identifier for the first execution batch, and an execution fire time; and
the synchronization cluster is configured to transmit a second execution timeout, including the plan identifier and the batch identifier, to the engine cluster at the execution fire time.

5. The workload distribution system of claim 4, wherein the planning process further includes generating the execution timer request based on the planning job, the execution fire time, and a hysteresis value for the workload distribution system.

6. The workload distribution system of claim 1,
wherein the workload includes a task to be performed and an execution time for the task; and
wherein each of the plurality of computing nodes is further configured to:
operate a local high-resolution timer service, and
processing the second execution batch includes:
scheduling, with the local high-resolution timer service, a local execution timeout based on the execution time, and
performing the task at the execution time based on the local execution timeout generated by the local high-resolution timer service.

7. The workload distribution system of claim 1, wherein the planning process further includes:
receiving the available planning job from the planning queue,
determining whether a planning job complexity metric for the planning job exceeds a maximum threshold,
responsive to determining that the planning job complexity metric exceeds the maximum threshold, generating at least two smaller planning jobs based on the planning job, and
storing the at least two smaller planning jobs in the planning queue.

8. The workload distribution system of claim 1, further comprising a load balancer for distributing user requests among the plurality of computing nodes.

9. The workload distribution system of claim 1, wherein the synchronization cluster is configured to operate a message broker for distributing planning timeouts and execution timeouts.

10. A method for distributing computing workloads in a distributed computing environment, the method comprising:
executing, on each of a plurality of computing nodes, a planning process that includes:
responsive to receiving a planning timeout from a synchronization cluster operating a global timer service:
generating a planning job based on the plan, and
storing the planning job in a planning queue; and
responsive to receiving an available planning job from the planning queue:
processing the available planning job to generate a first execution batch, and
storing the first execution batch on a state cluster; and
while concurrently executing the planning process, executing, on each of the plurality of computing nodes, a batch execution process that includes:
responsive to receiving an execution timeout from the synchronization cluster:
retrieving from the state cluster, based on the execution timeout, a second execution batch, and processing the second execution batch to execute a workload.

11. The method of claim 10, further comprising:

receive a workload generation request, and, responsive to receiving the workload generation request:

initializing a plan, for storing the first and second execution batches on the state cluster based on the workload generation request, and transmitting an initial planning timer request, based on the workload generation request, to the synchronization cluster.

12. The method of claim 11, further comprising:

generating the initial planning timer request including a plan identifier for the plan and an initial fire time, and transmitting, with the synchronization cluster an initial planning timeout, including the plan identifier, to the plurality of computing nodes at the initial fire time.

13. The method of claim 10, wherein the planning process further includes:

responsive to receiving the planning timeout:

retrieving, from the plan state database, a current state for a plan based on the planning timeout, determining, based on the current state and a planning queue size for the plan, whether additional planning jobs should be scheduled, generating the planning job responsive to determining that additional planning jobs should be scheduled, and transmitting a planning timer request, based on the plan, to the synchronization cluster.

14. The method of claim 13, further comprising:

generating the planning timer request including a plan identifier for the plan and a planning fire time based on a planning period for the plan, and wherein the synchronization cluster is configured to:

transmitting, with the synchronization cluster, a second planning timeout, including the plan identifier, to the plurality of computing nodes at the planning fire time.

15. The method of claim 10, wherein the planning process further includes transmitting an execution timer request, based on the first execution batch, to the synchronization cluster.

16. The method of claim 15, further comprising:

generating the execution timer request including a plan identifier for the plan, a batch identifier for the first execution batch, and an execution fire time; and transmitting, with the synchronization cluster, a second execution timeout, including the plan identifier and the batch identifier, to the plurality of computing nodes at the execution fire time.

17. The method of claim 15, wherein the planning process further includes generating the execution timer request based on the planning job and a hysteresis value for the workload distribution system.

18. The method of claim 10, wherein the workload includes a task to be performed and an execution time for the task, and the method further comprises:

operating at each of the plurality of computing nodes, a local high-resolution timer service, and processing the second execution batch by:

scheduling, with the local high-resolution timer service, a local execution timeout based on the execution time, and performing the task at the execution time based on the local execution timeout generated by the local high-resolution timer service.

19. The method of claim 10, wherein the planning process further includes:

receiving the available planning job from the planning queue, determining whether a planning job complexity metric for the planning job exceeds a maximum threshold, responsive to determining that the planning job complexity metric exceeds the maximum threshold, generating at least two smaller planning jobs based on the planning job, and storing the at least two smaller planning jobs in the planning queue.

20. The method of claim 10, wherein receiving a planning timeout includes receiving a planning timeout via a message broker cluster; and receiving an execution timeout includes receiving the execution timeout via the message broker cluster.

* * * * *